July 20, 1926.  
C. W. STEWART  
SEALING DEVICE FOR PIPES  
Filed Jan. 19, 1923

1,593,041

Inventor  
CLARENCE W. STEWART  
By  
Attorney

Patented July 20, 1926.

1,593,041

UNITED STATES PATENT OFFICE.

CLARENCE W. STEWART, OF LIMA, OHIO.

SEALING DEVICE FOR PIPES.

Application filed January 19, 1923. Serial No. 613,734.

This invention relates to sealing devices for pipes, and more particularly to sealing devices for water pipes.

An object of the invention is the provision of a sealing device consisting of an end plate and a clamping element which clamping element is adapted to fit over the bead on the end of a water pipe.

A further object is the provision of a sealing device which will withstand the high pressure usually present in water pipes.

A further object of the invention is the provision of a sealing device of simple and durable construction.

In the accompanying drawings, I have shown one embodiment of the invention. In this showing:—

Figure 1:
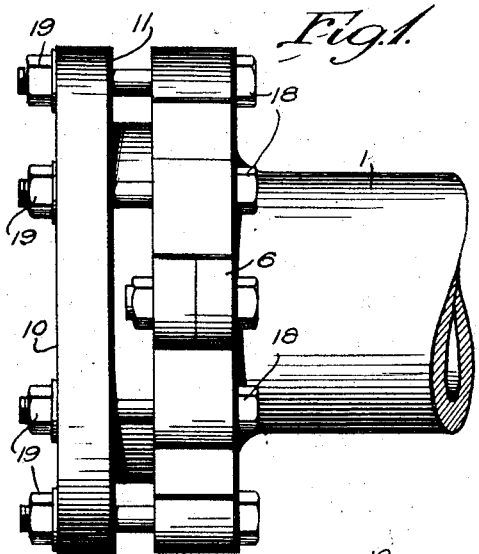
Figure 1 is a side elevation of a water pipe showing the invention applied.

Referring to the drawings, the reference numeral 1 designates a water pipe of ordinary construction having a bead 2 formed at one end for the purpose of receiving the plain end of a similar pipe. As shown, this bead is provided with an outer surface 3 extending substantially parallel to the axis of the pipe and then curving outwardly, as at 4.

The sealing device forming the subject matter of the present invention consists of a two-part clamp 5, having an inner face shaped to conform to the surface 3—4 of the pipe. The sections of the clamp are connected to each other by a hinge 6, and the free ends are adapted to be connected by a bolt 7, passing through flanges 8. As shown, a nut 9 is adapted to be arranged on the bolt to retain the clamp in closed position.

Figure 2:
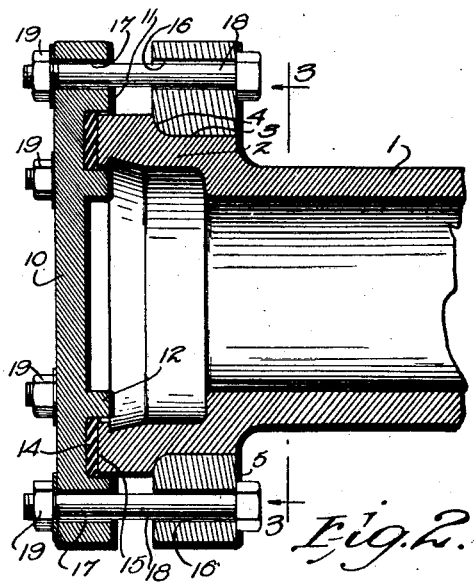
Figure 2 is a central vertical sectional view.

This clamp is adapted to support an end plate over the end of the pipe by means of which the pipe is closed for the purpose of conducting inspections and the like. As shown, the end plate consists of a disk 10 having an annular flange 11 arranged at its periphery. A rib 12 is arranged concentrically with the flange 11 and slightly spaced therefrom, forming a groove 13. This groove is adapted to receive a strip of packing 14, which abuts the end 15 of the pipe when in assembled position (see Figure 2). The clamp and end plate are provided with openings 16 and 17, adapted to receive bolts 18. Nuts 19 are arranged on the ends of these bolts and by tightening the nuts, the end plate may be brought into close engagement with the end of the pipe.

Figure 3:
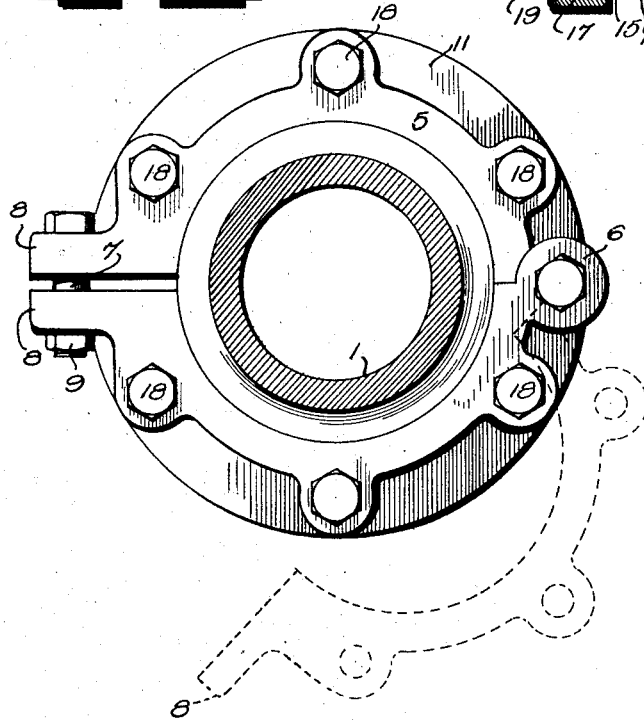
Figure 3 is a transverse sectional view on line 3—3 of Figure 2.
Figure 4:
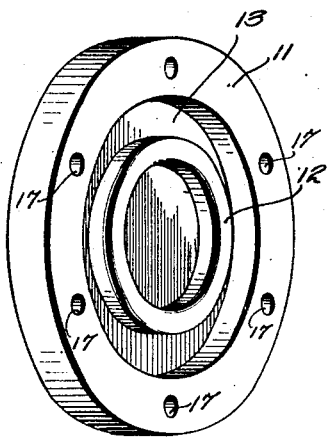
Figure 4 is a perspective view of the end plate.

The operation of the device will be apparent from the foregoing description. When a section of pipe is to be inspected, it is necessary to close or seal its end. The clamp is first placed in position by opening one-half, as indicated in dotted lines in Figure 3 of the drawings, and slipping it over the bead on the end of the pipe. The clamp is then tightened by placing the nut 9 on the bolt 7. The end plate is then arranged in position, with the packing strip 14 in the groove 13 and the bolts 18 inserted. The nuts 19 are then tightened and a sealing is obtained which will effectually prevent leakage from the end of the pipe.

It is to be understood that the form of the invention herewith shown and described is to be taken as a preferred example of the same, and that various changes in the shape, size, and arrangement of parts may be resorted to without departing from the spirit of the invention or the scope of the subjoined claim.

Having thus described my invention, I claim:—

A sealing device for a water pipe having a flanged end, said sealing device comprising a clamping member adapted to be arranged on the pipe inwardly of the flange, said clamping member comprising a pair of substantially semi-circular sections hinged to each other, the inner face of said sections being shaped to conform to the curvature of an adjacent portion of the flanged end of the pipe, the free ends of said sections being provided with outwardly extending flanges, said flanges being provided with openings adapted to aline when the clamping member is in closed position, a bolt passing through said openings, an end plate adapted to be arranged over the opening in the end of the pipe, said end plate being provided with flat inner and outer faces and being provided with a peripheral flange and a rib spaced therefrom to form a concentric groove on its inner face adapted to enclose the end of the pipe, a strip of packing mounted in said groove, said clamping member and said plate being provided with a plurality of openings extending axially of said pipe section, and bolts passing through said openings to retain said end plate in position.

In testimony whereof, I affix my signature.

CLARENCE W. STEWART.